United States Patent
Hellquist

[15] 3,672,384
[45] June 27, 1972

[54] BREATHING GAS REGULATOR FOR AVIATORS

[72] Inventor: Ivan A. Hellquist, Rotebro, Sweden
[73] Assignee: AGA Aktiebolag, Lidingo, Sweden
[22] Filed: Sept. 15, 1970
[21] Appl. No.: 72,340

[30] Foreign Application Priority Data

Sept. 18, 1969 Sweden.................................12810/69

[52] U.S. Cl.................................137/39, 128/142.5, 137/81
[51] Int. Cl.........................................................G05d 16/00
[58] Field of Search..............137/39, 81; 128/142.5; 98/1.5; 2/2.1 A

[56] References Cited

UNITED STATES PATENTS

| | | | |
|---|---|---|---|
| 2,834,343 | 5/1958 | Keckler et al........................128/142.5 |
| 3,077,881 | 2/1963 | Sprague..............................128/142.5 |
| 3,430,642 | 3/1969 | Mack.......................................137/39 |

*Primary Examiner*—Robert G. Nilson
*Attorney*—Larson, Taylor and Hinds

[57] ABSTRACT

A breathing gas regulator for an aviator comprises an oxygen supply, a first pressure reducing valve, a second pressure reducing valve, and a branch line intermediate the two pressure reducing valves for conveying gas to pressurize the aviator suit in the event of cabin pressure failure. The second pressure reducing valve acts as a demand regulator supplying breathing gas at a normal breathing pressure of about 20 mm water column. The breathing gas outlet includes an air injector open to the cabin at cabin altitudes of up to 6 km for mixing air with the oxygen. The branch line includes a pressure responsive valve which shuts off the air supply at a cabin altitude of 6 km. Thus, the regulator supplies 100 percent oxygen at higher cabin altitudes. The branch line also includes a pressure-responsive control for increasing the breathing gas pressure in the event of a loss of cabin pressure. In that event, the control unit increases the gas pressure supplied by the demand regulator an amount necessitated by the altitude. The branch line supplies gas to pressurize the suit and the amount of this pressure is conveniently set by controls as a function of breathing gas pressure. For example, suit pressure may be approximately 3.5 times breathing gas pressure. The device preferably includes a g-susceptible valve for pressurizing the suit to counter the effect of g-forces to which the aviator is subjected. In this event, suit pressure is controlled by suitable means, such as a shuttle valve, such that it will be a function of breathing gas pressure or the magnitude of a gas signal produced by the g-forces, whichever is greater.

3 Claims, 1 Drawing Figure

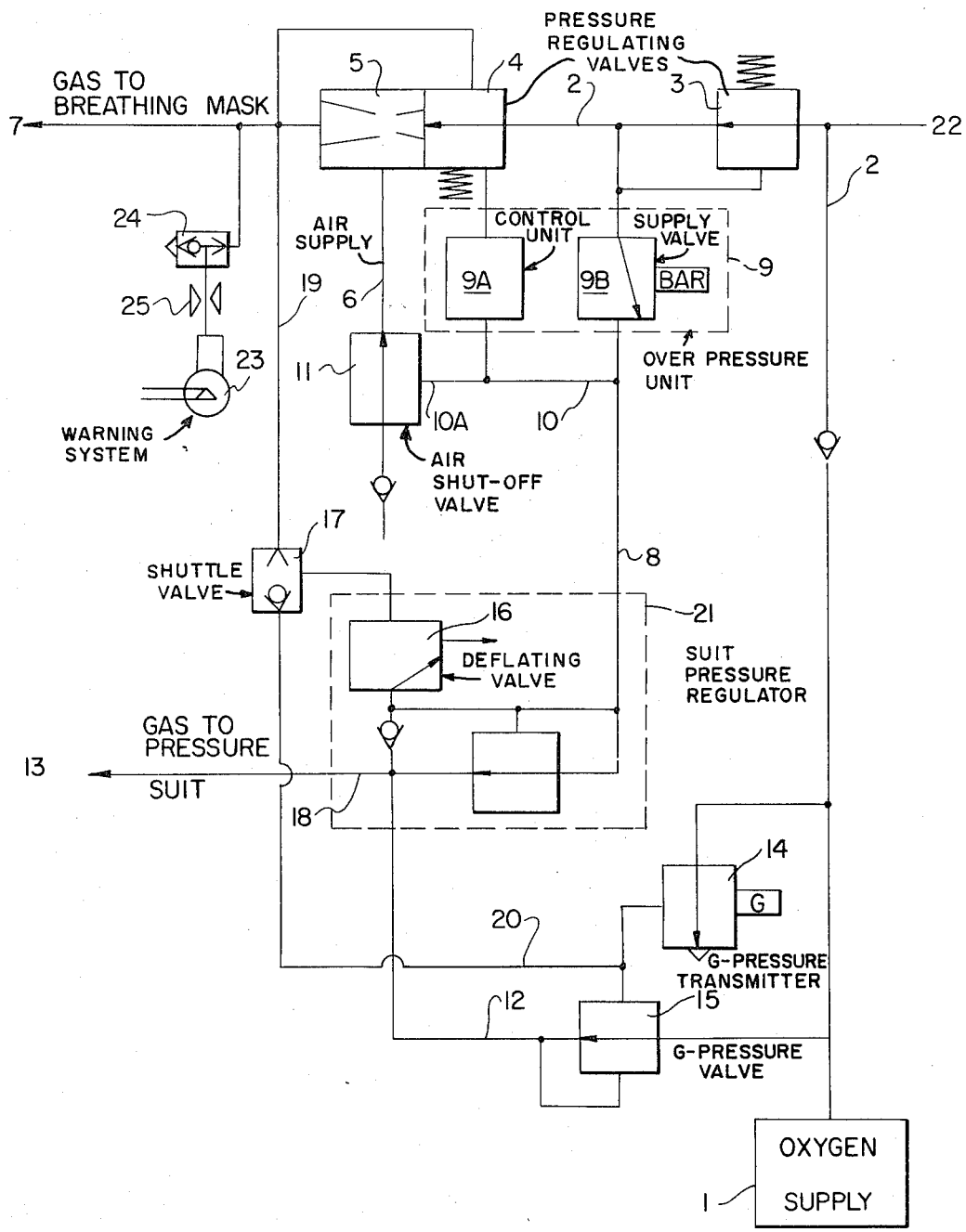

3,672,384

BREATHING GAS REGULATOR FOR AVIATORS

BACKGROUND OF THE INVENTION

The present invention relates to a regulator of the gas supply to aviator outfits intended to be used at high altitude flights. Such regulators consist of a system for the supply of breathing gas, which system is also intended to influence a further system for the control of the gas supply to the pilot's pressure suit for the compensation of reduced cabin pressure.

Previously in connection with flying at high altitudes and over ocean areas certain safety regulations existed, which prescribed a complicated suit outfit for the pilot's safety to be used both at his ordinary duties and in possible emergency situations. These suits, especially when inflated with gas as indicated above, were rather uncomfortable, in that the pilot was compelled to wear at the same time several different suits. However, a simplified type of suit has now been designed which replaces the previous set of suits. The new suit has considerably increased the pilot's comfort but it was found that it was not possible to control the pressure build-up in the suit with the previously known regulators.

Difficult problems had to be solved in the design of an adequate regulator for the new suit. For example, it was necessary to consider the limited space and the limited weight which are made available for such an outfit in modern airplanes. Another problem was that the breathing gas pressure should be substantially lower than the gas pressure intended for the build-up of pressure in the pressure suit.

It is an object of the present invention to provide a regulator for gas supply to an aviator outfit which overcomes the difficulties mentioned above. It is a further object to provide such a regulator which includes means to admix air with an oxygen breathing gas supply at higher cabin pressures and to supply oxygen breathing gas supply at lower cabin pressures. It is a further object to provide such a regulator with a system for suit pressure increase to compensate for g-forces.

BRIEF SUMMARY OF THE INVENTION

The foregoing and other objects which will be apparent to those having ordinary skill in the art are achieved according to the present invention by providing a regulator for gas supply to an aviator outfit comprising a gas supply conduit; first and second pressure reducing valves arranged in series in said gas supply conduit to reduce the pressure of gas introduced into said conduit in stages to provide a low pressure breathing gas supply from the outlet of said second pressure reducing valve, gas conduit means for conveying gas from said gas supply conduit from a point intermediate said first and second pressure reducing valves to provide a suit-pressurizing gas supply for the aviator outfit, valve means responsive to ambient pressure for controlling the flow of gas in said gas conduit means, and control means responsive to pressure in said gas conduit means relative to ambient pressure for adjusting the output pressure of said second pressure reducing valve to regulate the pressure of said breathing gas supply.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

The drawing is a diagrammatic illustration of a regulator according to the present invention.

By the present invention a regulator has been obtained which is well suited for the duties and requirements which are made in modern types of airplanes. Characteristics of the regulator in accordance with the invention is that the valve system comprises two pressure-reducing valves arranged in the breathing line, one after the other. Between these valves is connected a branch line intended for the gas supply to the pressure suit, and in the same line there is an over-pressure unit that is responsive to the pressure in the atmosphere surrounding the regulator.

For providing the pilot with breathing gas, whose air-oxygen mixture shall be adapted according to the ambient pressure, the second pressure reducing valve (stage 2), designed as a demand regulator, is provided with an ejector. The propelling gas in this ejector is the oxygen, which draws in a certain amount of air from an air intake (normally cabin air). In the air intake there is a cut-off valve which is controlled by the pressure in the branch line. A pressure sensitive valve in the branch line shuts off the air intake valve at a cabin altitude of, for example, 6 km such that the aviator breathes an air-oxygen mixture at lower cabin altitudes and oxygen at higher cabin altitudes.

At high cabin altitudes, additional oxygen in the breathing gas is necessary and must thus not fail to appear. The regulator system is provided for this purpose with a warning system, which comes into action with a certain time delay in the event of oxygen failure. This time delay is necessary to avoid "false alarm" due to pressure dips on rapid inhalations for which the demand function cannot immediately compensate. For example, at an extremely vigorous inhalation, a fairly strong underpressure of short duration may arise in the breathing line which would influence a warning system not including a time delay.

At the centrifugal forces or g-loads to which a modern airplane is exposed, it is necessary to produce counter-pressure that protects the aviator from the effects of such forces. This is preferably achieved by inflating the pressure suit. For this purpose a regulator controlled by a g-susceptible valve, called hereinafter g-pressure valve, is arranged in another feed line for gas to the pressure suit. The regulator may be combined with an injector for introducing air into the gas to the pressure suit. The pressure suit can thus be inflated from two separate systems, on the one hand via the branch line for compensation of a pressure drop in the cabin and on the other hand via the feed line for producing counter-pressure at g-loads. The deflating of the pressure suit takes place via a deflating valve arranged in a side branch of the pressure suit inlet. The inlet is common to the gas supply from the branch line and from the feed line.

A preferred embodiment of the invention will now be described with reference to the enclosed drawing.

From a gas source 1 leads a breathing line 2, in which are connected first and second pressure reducing valves 3 and 4. To the second reducing valve 4, which is designed as a demand regulator, is connected an ejector 5 for the mixing in of air from an air supply line 6. The breathing line 2 is connected to a breathing mask (not shown) at 7.

Between the reducing valves 3 and 4 a branch line 8 is connected. The branch line 8 contains an over-pressure unit 9 provided with a valve 9B for the supply of gas to a pressure suit connected at 13 and a control unit 9A, the function of which is to control the secondary pressure of reducing valve 4 so that the breathing gas pressure will not fall below 145 mm Hg or 0.21 bars (absolute pressure) which is equivalent to ground level oxygen partial pressure in air and which is necessary to keep up adequate oxygenation of the blood. The absolute pressure 145 mm Hg occurs as a result of reduced cabin pressure or loss of cabin pressure at altitudes over 12 km. Supply valve 9B is controlled by the ambient pressure, normally the cabin pressure. At a given cabin pressure, for example, a cabin pressure altitude of 6 km, valve 9B opens thus introducing pressure into branch line 8 and, in turn, into line 10 leading to control unit 9A and to ambient air cut off valve 11. The control unit 9A is furnished with an aneroid-controlled discharge valve (not shown) that opens to the ambient atmosphere, normally the cabin. At ambient pressure values above 145 mm Hg the discharge valve is open and lets out a continuous flow of oxygen supplied from line 10 through an orifice between line 10 and 9A, so that the pressure in 9A is practically equal to the ambient pressure.

If the ambient pressure drops to or below 145 mm Hg the aneroid expansion causes a reduction of the discharge valve outlet area so as to create a pressure differential over the discharge valve.

In this position the aneroid regulates the absolute pressure in 9A to be very near 145 mm Hg by counteracting tendencies towards pressure decrease with reduction of the discharge outlet area and tendencies towards pressure increase with increase of the discharge outlet area.

It follows that the regulator gives a pressure ("overpressure") in the mask which equals the difference between the absolute pressure in 9A (145 mm Hg) and the ambient absolute pressure plus the safety pressure 20 mm $H_2O$ (1.5 mm Hg).

If for example the cabin pressure is lost at 15 km corresponding to an absolute ambient pressure of approx 90 mm Hg the "overpressure" in the mask would be 145−90+1.5 = 56.5 mm Hg.

In this way the breathing pressure ("overpressure") at 12 km or higher is correlated to the altitude. Control line 10A for air shut-off valve 11 in the air supply line 6 is connected to the branch line 8 downstream of the overpressure unit 9. Moreover a suit pressure regulator 21 is arranged in the branch line 8.

From the gas source 1 there is also a feed line 12 to the pressure suit via connection 13. A g-pressure valve 15 controlled by a g-pressure transmitter 14 is connected in the feed line 12. The supply of gas from this feed line 12 is influenced by the g-load which arises at changes in the course of the airplane. An injector (not shown) for the mixing in of air can also be connected to the g-pressure valve 15.

The deflating of the pressure suit takes place via a deflating valve 16 in the suit inlet 18 which is common to branch line 8 and feed line 12. The deflating valve 16 is controlled by the g-pressure transmitter pressure (line 20) or by the pressure in the mask inlet 7 (line 19) via a shuttle valve 17. This valve is further so designed that it shuts off the one of lines 19 and 20 which at the moment has the lower pressure. In this way the highest prevailing pressure in these lines determines the discharge pressure of the suit.

The normal and principal duty of the regulator consists in providing the pilot with oxygen under a slight overpressure, the so-called "safety pressure" which is usually about 20 mm water column. At cabin altitudes of up to 6 km the oxygen is mixed with air through line 6 so as to prevent physiological discomforts owing to excessive oxygen percentages. At cabin altitudes above 6 km, the control line 10 is pressurized by actuation of valve 9B. The pressure in line 10 keeps the shut-off valve 11 closed, so that no drawing in of ambient air can take place. At interruption of the oxygen supply, shut-off valve 11 is consequently unloaded and opens for underpressure in the breathing line 7. The aviator can in this way, without feeling any appreciable breathing resistance, breathe in air from the environment via the shut-off valve 11 and the ejector 5. To give the aviator a warning at oxygen failure and an indication to release the existing emergency oxygen system, a warning device is connected to the breathing line at 7.

The warning system comprises a pressure responsive switch 23, an orifice 25 and a shuttle valve 24. The switch 23 lights a lamp on the warning panel of the airplane when the "safety pressure" drops below a certain value. Owing to the orifice 25 the warning lamp is lit with a certain time delay after the "safety pressure" has disappeared. This prevents any false alarm in case of a shorttime "dip" in the safety pressure which may arise also at normal oxygen gas supply and normal breathing. At extremely vigorous inhalations, a quite strong underpressure in the breathing line may occur temporarily, even at normal oxygen supply. In case of underpressure in the breathing line 7 the shuttle valve 24 connects the pressure responsive switch 23 to the ambient atmosphere (cabin). Irrespective of the size of the underpressure, the pressure difference over the orifice 25 and thus also the delay period remain the same as when the safety pressure disappears, so that false alarm on the grounds of extreme breathing is prevented.

The reduction in pressure of oxygen supply 1 from primary pressure, which may vary between normally 15 and at emergency release 150 kg/cm², to normal breathing pressure of, for example, 20 mm water column, takes place in two stages, the second stage being demand regulator 4, from which the oxygen is supplied to the mask at 7. The demand regulator 4 is adapted to respond to the small pressure difference (in this case below safety pressure) which a man without discomfort can perform when inhaling. Ambient air for the breathing gas mixture is automatically sucked in through injector 5, which receives its propellant gas over a dosage valve in the demand regulator 4. At loss of cabin pressure at altitudes over 12 km the aneroid valve of the control unit 9A influences the demand regulator 4 so that the breathing gas pressure is raised to a value continuously matching the altitude. The aneroid of the valve 9B comes into operation at 6 km altitude where ambient air supply is shut off.

By means of the present regulator the pressure suit of the pilot can thus be provided from a connecting point 13 with the necessary pressure both at pressure breathing and at g-loads. The pressure comes in the first place from a suit pressure regulator 21 with deflating valve 16 built into the regulator unit. The suit pressure regulator 21 is controlled (via deflating valve 16) by the breathing gas pressure ($P_b$) in such a way that the pressure delivered to the pressure suit is approximately 3.5 ($P_b$−9) mm Hg.

The deflating valve 16 is designed to let out a continuous pilot flow of oxygen supplied from line 8 through an orifice (not shown) in a control line between line 8 and valve 16.

Downstream this orifice a pressure controlled regulator (not shown) is connected to said control line. At a certain breathing gas pressure supplied via line 19 and shuttle valve 17 a diaphragm is forced towards a valve seat in valve 16, damming up the control gas flow and thus creating a control pressure that acts on the regulator. A non-return valve prevents the control gas flow from escaping to the pressure suit.

If the breathing gas pressure increases to 9 mm Hg the control pressure causes the regulator to start inflating the pressure suit. Further breathing pressure increase inflates the suit to a pressure that is 3.5 times the breathing pressure minus 9 mm Hg. By suitable dimensioning of the ratio between the diaphragm and the deflating valve seat areas the factor 3.5 is obtained.

Physiological tests have shown that the value 3.5 gives an adequate body counterpressure at pressure breathing in combination with an ordinary g-suit.

At g-loads the suit pressure is delivered by the oxygen-fed g-pressure valve 15. The g-pressure valve 15 is connected to the suit pressure regulator 21 through the deflating valve 16. The correct co-ordination of the two valves 15 and 21 is achieved by giving the g-pressure valve 15 the same amplification factor 3.5. The g-pressure valve is controlled by a g-pressure transmitter 14. When the breathing gas pressure $P_b$ is smaller than the output pressure from the g-pressure transmitter 14 this output pressure also controls the deflating valve 16 included in the suit pressure regulator 21 over line 20. Because of the amplification factor of the g-pressure valve 15, the g-pressure transmitter 14 is dimensioned for a pressure which is 3.5 times lower than the required g-pressure (suit-pressure at g-load). Since the g-pressure valve 15 as well as the deflating valve 16 are dimensioned so that their controlling pressure is amplified 3.5 times, it is possible to control both valves with one and the same transmitter 14.

Gas source 1 is the ordinary oxygen supply of the airplane. As an emergency container, an oxygen cylinder may be connected at 22. The emergency container can be connected via a direct line (not shown), to the breathing mask at 7. The regulator in accordance with the invention can also be modified in other ways, for example by providing safety valves against excess pressure in the different lines and by providing warning devices for notifying the aviator when the pressure in the system drops below a certain value owing to oxygen failure.

Operation of the device is as follows. At cabin altitudes of up to 6 km, valve 9B remains closed, Thus ambient air is introduced into the breathing line by means of valve 11 and injector 5. At a cabin altitude of 6 km, valve 9B is opened thus connecting branch line 8 with the oxygen supply intermediate regulators 3 and 4. Thus, branch line 8 is pressurized to the gas pressure prevailing between the reducing valves which pressure, in a typical example, is 0.67 bars. Branch line 10 is also pressurized which closes valve 11 thus terminating the flow of ambient air into the breathing line. The breathing mask is then provided with oxygen only supplied from the oxygen supply 1 at cabin altitudes greater than 6 km. Control unit 9A includes an aneroid sensing device responsive to the absolute pressure downstream of the orifice in the control line between line 10 and regulator 4. In the event of a loss of cabin pressure at altitudes above 12 km, the aneroid device of control unit 9A functions to maintain the absolute output pressure i.e. to increase the output "overpressure" of pressure regulator 4 and accordingly the breathing "overpressure". The amount of increase is proportional to the absolute ambient pressure which, with a total loss in cabin pressure, will correspond to the atmospheric pressure prevailing at the plane's altitude. At the same time, suit pressure is regulated by the suit pressure regulator 21 to be approximately 3.5 times the breathing gas pressure in order to compensate for the physiological effects on the aviator's circulatory system caused by the breathing "overpressure".

In the event that the aviator is subjected to g-forces, the suit pressure is increased, irrespective of cabin pressure loss, through line 12 by an amount proportional to the momentary g-forces. Suit pressure is regulated by g-pressure valve 15 and by deflating valve 16 under the influence of a pressure signal in line 20 proportional to the g-forces. The g-pressure signal is generated by g-pressure transmitter 14.

Through the action of the shuttle valve 17 the deflating valve 16 will be connected to the higher of the pressures prevailing in either line 20 or line 19. Thus, when the pressure in line 20 is higher the suit pressure is controlled by the g-pressure regulator 15 and deflating valve 16 and when the pressure in line 19 is higher the suit pressure is controlled by the suit pressure regulator 21 in which case the deflating valve 16 is acting also as a control valve. Thus, suit pressure will be controlled independently either by g-forces or, if cabin pressure is lost at altitudes above 12 km, by the pressure in line 7.

What is claimed is:

1. A regulator for gas supply to an aviator outfit comprising: a gas supply conduit; first and second pressure reducing valves arranged in series in said gas supply conduit to reduce the pressure of gas introduced into said conduit in stages to provide a low pressure breathing gas supply from the outlet of said second pressure reducing valve; gas conduit means for conveying gas from said gas supply conduit from a point intermediate said first and second pressure reducing valves to provide a suit-pressurizing gas supply for the aviator outfit; valve means responsive to ambient pressure for controlling the flow of gas in said gas conduit means; control means responsive to pressure in said gas conduit means relative to ambient pressure for adjusting the output pressure of said second pressure reducing valve to regulate the pressure of said breathing gas supply; air inlet means for introducing air into said breathing gas supply; valve means for controlling the air flow therein responsive to pressure in said gas conduit means; and g-responsive valve means for supplying a further suit-pressurizing gas supply for the aviator outfit.

2. A regulator according to claim 1 including suit pressure deflating valve means controllable by gas pressure in said breathing gas supply and in said g-responsive valve means.

3. A regulator according to claim 2 wherein said g-responsive valve means includes a g-pressure transmitter and wherein said regulator further includes a shuttle valve for diverting the higher pressure in said breathing gas supply and said g-transmitter for controlling said suit pressure deflating valve means.

* * * * *